United States Patent
Itoh

Patent Number: 6,073,832
Date of Patent: Jun. 13, 2000

[54] SOLDERING METHOD AND APPARATUS

[75] Inventor: Takahiro Itoh, Nagano, Japan

[73] Assignee: Tamagawa Seiki Kabushiki Kaisha, Nagano-Ken, Japan

[21] Appl. No.: 09/082,076

[22] Filed: May 21, 1998

[30] Foreign Application Priority Data

Nov. 17, 1997 [JP] Japan ................. 9-315382

[51] Int. Cl.$^7$ .......... B23K 31/02; B23K 35/12; B32B 27/00; D02G 3/00
[52] U.S. Cl. .......... 228/256; 228/262; 228/179.1; 228/111.5; 428/383
[58] Field of Search .......... 228/256, 262, 228/179.1, 111.5; 428/383

[56] References Cited

U.S. PATENT DOCUMENTS

| | | | |
|---|---|---|---|
| 3,834,015 | 9/1974 | Di Renzo | 29/628 |
| 3,991,933 | 11/1976 | Antonevich | 228/110 |
| 3,993,236 | 11/1976 | Antonevich | 228/110 |
| 3,995,584 | 12/1976 | Wendt | 118/72 |
| 4,013,212 | 3/1977 | Miller | 228/203 |
| 4,216,263 | 8/1980 | Otis et al. | 428/373 |
| 4,256,252 | 3/1981 | Huppunen et al. | 228/1 A |
| 4,684,056 | 8/1987 | Deambrosio | 228/180.1 |
| 5,219,658 | 6/1993 | Ueoka | 428/383 |
| 5,260,098 | 11/1993 | Trentesaux et al. | |
| 5,497,936 | 3/1996 | Vojta et al. | 228/173.5 |
| 5,637,833 | 6/1997 | Banks et al. | |

FOREIGN PATENT DOCUMENTS

| | | |
|---|---|---|
| 492 654 | 7/1992 | European Pat. Off. |
| 30 36 197 | 4/1982 | Germany |

*Primary Examiner*—Patrick Ryan
*Assistant Examiner*—Cecilia Newsome
*Attorney, Agent, or Firm*—Sughrue, Mion, Zinn, Macpeak & Seas, PLLC

[57] ABSTRACT

Method and apparatus, by which the relative displacement between molten solder and a terminal pin is caused and further, a coating formed on an end portion of a coil is removed by molten solder and thus the terminal portion is firmly soldered to the terminal pin after removing the coating. In contrast, in the case of conventional soldering method, when a terminal pin, which is provided on a terminal base and has an end portion of a coil wound therearound, is dipped in molten solder contained in a solder bath, there is caused no relative displacement between the pin and the molten solder. Thus, sometimes, the coating formed on the coil still remains, so that the soldering connection between the terminal pin and the coil is not sufficiently achieved. However, in accordance with the method and apparatus of the present invention, the firm connection therebetween is achieved. Consequently, the reliability thereof is enhanced.

4 Claims, 1 Drawing Sheet

SOLDERING METHOD AND APPARATUS

BACKGROUND OF THE INVENTION

1. Field of the Invention

The present invention generally relates to a soldering method and apparatus, and more particularly, to a novel improvement in a method and apparatus for providing sure electrical connection by causing relative displacement between a terminal pin, which has a coil and is dipped into molten solder in a solder bath, and the molten solder to thereby remove a coating from the coil.

2. Description of the Related Art

Hitherto, there has been employed a soldering method of such a kind for soldering, for example, a resolver as follows. Namely, in the case of soldering a resolver, an end part 2a of a coil 2 of the resolver is entwined and wound around a terminal pin 1 provided on a terminal base or block of a resolver, as illustrated in FIG. 1. Then, this terminal pin 1 is dipped into molten solder 4, which is contained in a solder bath 3, with the result that the end part 2a of the coil 2 is electrically connected with the terminal pin 1 by using solder.

The conventional soldering method is implemented as above described, and thus has encountered the following problem. Namely, as a result of performing a solder dipping operation while a terminal pin is dipped in a solder bath after being brought down from above into a molten solder held in the solder bath which is in a state of rest, there may be the case that a coating formed on a coil is not sufficiently dissolved and thus remains thereon, and that problems in quality occurs, for instance, the electrical connection between the coil and the terminal pin is insufficient.

The present invention is accomplished to solve the aforementioned problems.

SUMMARY OF THE INVENTION

Accordingly, an object of the present invention is to provide a soldering method and apparatus, by which the electrical connection between a coil and a terminal pin is assured by causing relative displacement between a terminal pin, which has a coil and is dipped into molten solder contained in a solder bath, and the molten solder to thereby remove a coating from the coil.

To achieve the foregoing object, in accordance with an aspect of the present invention, there is provided a soldering method having the steps of dipping a terminal pin, to which an end portion of a coil is connected, in molten solder contained in a solder bath and of soldering the end portion of the aforesaid coil to the aforesaid terminal pin by using solder. This soldering method further comprises the step of causing the relative displacement between the aforesaid molten solder and the aforesaid terminal pin. Further, in the case of an embodiment of this soldering method, the relative displacement is caused by moving the aforesaid solder bath. Moreover, in the case of another embodiment of this soldering method, the relative displacement is caused by moving the aforesaid terminal pin. Furthermore, in the case of still another embodiment of this soldering method, the relative displacement is caused by stirring the aforesaid molten solder.

To achieve the foregoing object, in accordance with another aspect of the present invention, there is provided a soldering apparatus for dipping a terminal pin, to which an end portion of a coil is connected, in molten solder contained in a solder bath and for soldering the end portion of the aforesaid coil to the aforesaid terminal pin by using solder. This soldering apparatus further comprises relative displacement means for causing the relative displacement between the aforesaid molten solder and the aforesaid terminal pin. Further, in the case of an embodiment of this apparatus, the relative displacement means is an actuator for causing a reciprocating motion of the aforesaid terminal pin or of the aforesaid solder bath.

Soldering method and apparatus of the present invention are constructed as above described and thus have the following advantageous effects. Namely, as a result of the relative displacement of one of the solder bath and the terminal base by means of the relative displacement means, there is caused the relative displacement of the coil and the terminal pin with respect to the molten solder. This relative displacement results in removal of the coating from the end portion of the coil. Thus, the soldering connection between the end portion, from which the coating is removed, and the terminal pin is completely achieved. Consequently, the reduction in quality, which would occur in the case of the conventional soldering method and apparatus, can be prevented.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Figure 1:
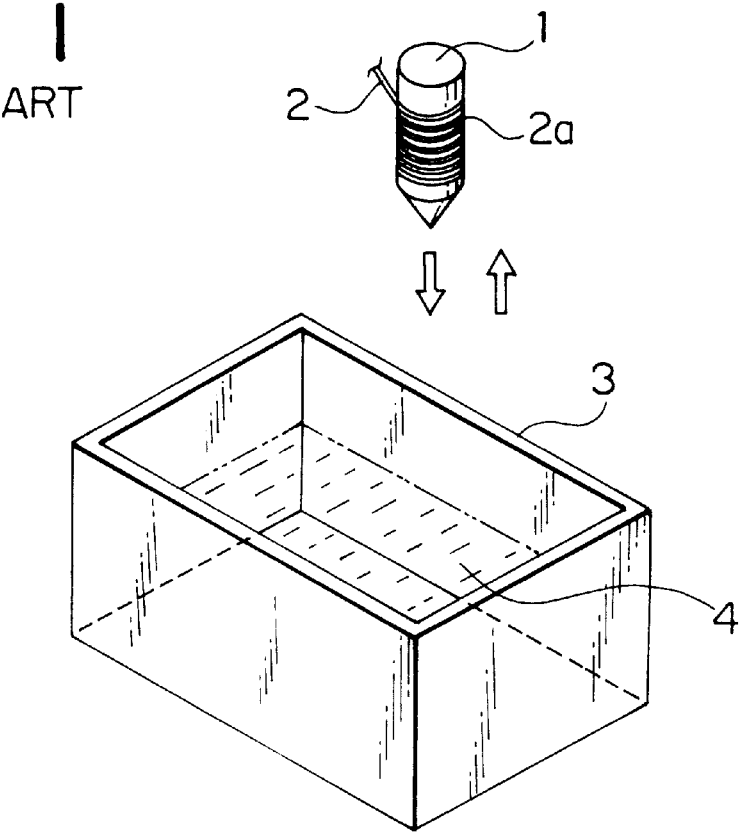
FIG. 1 is a schematic diagram illustrating a conventional method.

Hereinafter, the preferred embodiment of the present invention will be described in detail by referring to the accompanying drawings. Incidentally, in the figures, like reference characters designate like or corresponding components of the conventional apparatus.

Figure 2:
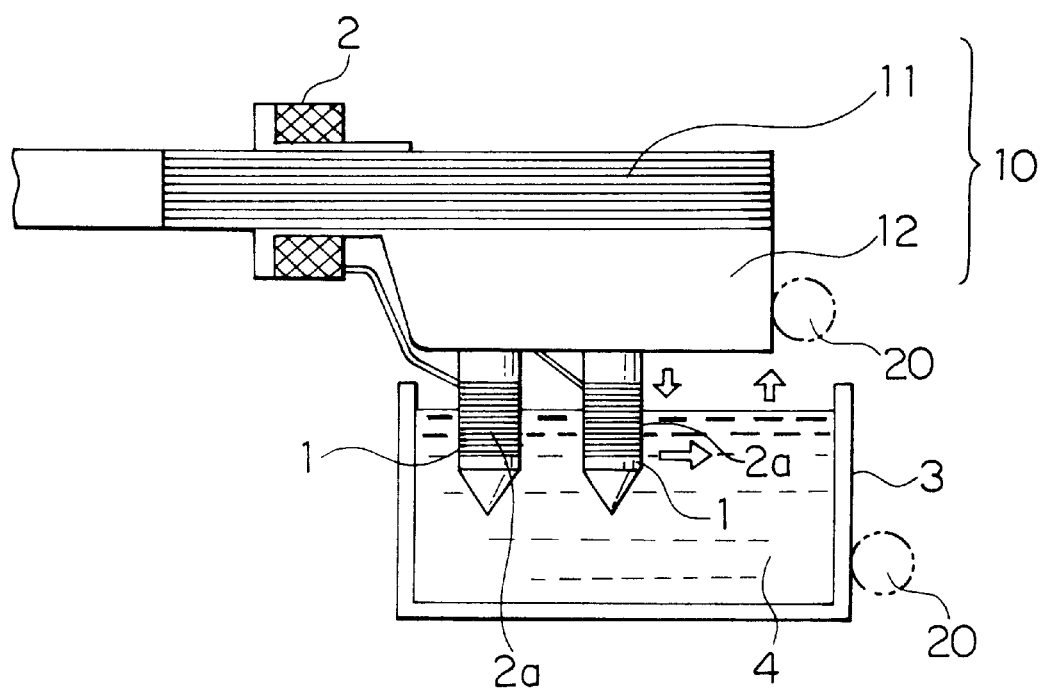
FIG. 2 is a schematic diagram illustrating a method and apparatus for soldering according to the present invention.

In FIG. 2, reference numeral 10 denotes a known resolver consisting of a stator 11 and a terminal base 12. An end portion 2a of a coil 2 of the resolver 10 held by this stator 11 and the terminal base 12 is entwined and wound around a plurality of terminal pins 1. Further, a reciprocatingly movable actuator 20, such as a known vibrator, rotating cam, or cylinder (not shown), is provided on this terminal base 12 or the solder bath 3. Relative displacement between the solder bath 3 and the terminal pin 1 is achieved by operating this actuator 20. This actuator 20 constitutes relative displacement means for causing the relative displacement of one of the solder bath 3 and the terminal pin 1.

Next, an operation of this embodiment will be described hereinbelow. First, the pin 1 provided on the terminal base 12 of the resolver 10 configured as above described is dipped into molten solder 4 contained in the solder bath 3. Then, the relative displacement between the terminal pin 1 and the molten solder 4 is caused by reciprocatingly moving the terminal base 12 or the solder bath 3, for example, in a horizontal direction through the aforementioned relative displacement means 20. Thus, the molten solder 4 is moved with respect to the end portion 2a of the coil 2. Thus, a coating applied on the end portion 2a of the coil 2 peels off or melts owing to the heat and the displacement of the molten solder 4. Subsequently, the end portion 2a is connected to the terminal pin 1 by being soldered thereto by using the molten solder 4. Therefore, the electrical connection between the end portion 2a, from which the coating is removed, of the coil 2 and the terminal pin 1, which cannot be achieved by the conventional method, is completely achieved. Incidentally, in the case of stirring the aforementioned molten solder 4 by using stirring means such as a propeller (not shown), the aforementioned relative displacement can be similarly performed.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A soldering method comprising the steps of:

dipping a terminal pin (1), to which an end portion (2a) of a coil (2) is connected, in molten solder (4) contained in a solder bath (3) for soldering the end portion (2a) of said coil (2) to said terminal pin (1) by using solder; and causing relative displacement between said molten solder (4) and said terminal pin (1) by reciprocating one of said molten solder and said terminal pin in a horizontal direction while said terminal pin is in said molten solder, wherein a coating of said coil is removed from said coil during said dipping and reciprocating steps.

2. The soldering method as set forth in claim 1, wherein the relative displacement is caused by moving said solder bath (3).

3. The soldering method as set forth in claim 1, wherein the relative displacement is caused by moving said terminal pin (1).

4. The soldering method as set forth in claim 1, wherein the relative displacement is caused by stirring said molten solder (4).

* * * * *